United States Patent [19]

Frisone

[11] 3,752,932

[45] Aug. 14, 1973

[54] LOOP COMMUNICATIONS SYSTEM

[75] Inventor: John Batista Frisone, Raleigh, N.C.

[73] Assignee: International Business Machines Corporation, Armonk, N.Y.

[22] Filed: Dec. 14, 1971

[21] Appl. No.: 207,864

[52] U.S. Cl. ...... 179/15 AL, 340/172.5, 179/15 BA

[51] Int. Cl. ........................................ H04q 5/00

[58] Field of Search ........................ 340/172.5, 163; 179/15 AL, 15 AF, 15 BA

[56] References Cited

UNITED STATES PATENTS

| | | | |
|---|---|---|---|
| 3,659,271 | 4/1972 | Collins | 179/15 AL |
| 3,633,166 | 1/1972 | Picard | 179/15 AL |
| 3,544,976 | 12/1970 | Collins | 179/15 AL |
| 3,639,904 | 2/1972 | Arulpragasam | 179/15 AL |

*Primary Examiner*—Kathleen H. Claffy
*Assistant Examiner*—Thomas D'Amico
*Attorney*—Dewey J. Cunningham, John B. Frisone et al.

[57] ABSTRACT

A communications system including a central station connected in a series loop with a plurality of remote stations and in which under control of said central station, the remote stations in the order of their physical position transmit data to the central station.

6 Claims, 5 Drawing Figures

Patented Aug. 14, 1973 3,752,932

4 Sheets-Sheet 1

LOOP COMMUNICATIONS SYSTEM

FIELD OF THE INVENTION

The invention relates to communications systems in general and more particularly to serial loop communications systems in which data is transmitted in one direction around the loop.

DESCRIPTION OF THE PRIOR ART

Serial loop data communications systems have been known for some time. They utilize a number of different forms of control. The control techniques may be divided into two broad categories. In the first category, messages from and to the connected terminals are broken up into segments and transmitted within predetermined time slots via the loop. The time slots may be permanently assigned to a given terminal in which case each terminal must be provided with its own time slot. Such systems are inefficient in their use of the communications capacity since during periods of inactivity, the channel capacity represented by the assigned time slot is wasted. Alternative control techniques have been proposed in which a limited number of time slots are shared amongst a larger number of terminals. The assigment of the limited number of slots may be accomplished in many different ways. A further discussion of these techniques is unnesessary since they are not of more than passing interest to the invention disclosed herein.

The second category includes control techniques which permit variable length messages to be transmitted as a single contiguous entity. This category is particularly suitable for use with relatively low speed communications channels such as voice grade telephone lines which connect large numbers of terminals in a series loop since a small percentage of the channel capacity is devoted to overhead items such as addressing, control and transmission error checking.

An early system of this type was described by J. M. Unk in an article entitled, "Communication Networks for Digital Information", published in the IRE Transactions on Communications Systems, December, 1960. This system did, however, have a maximum limitation placed on message length and therefore does not meet all the requirements of the category. In addition, expanding the message length would be impractical since it would introduce substantial delay into the communications path. Such delay would increase substantially, for long messages at least, the response time. That is, the time delay between the time a message is sent by a terminal until it receives a reply or acknowledgement.

A much later system described in Belgium Pat. No. 724,318 overcame most of the above objections. It can handle messages of any length and does this without introducing delay. In this system, the central station issues in succession a pair of control signals. The first control signal is a switching signal which permits any remote station requiring service to switch a shift register window in series with the serial loop. The second signal will only reach the first shift register in the series of registers. The other downstream registers receive the first signal from the register of the prior upstream register. Receipt of two first control signals in succession cause the downstream terminals to switch out. The upstream terminal which receives both the first and second signals transmits its data and then takes over the function of the central by generating the pair of control signals for transmission downstream only.

The above method of control solves many of the problems found in the method of control described by Unk; however, the central station loses control since the transmitting terminals each in succession generate the control signal pairs as they complete transmission. In addition, each station must be equipped to generate these signals for issuance when it completes transmission.

SUMMARY OF THE INVENTION

The invention contemplates a serial loop data transmission system in which a central station is connected to the first and last stations of a plurality of serially connected remote stations for transmitting and receiving data signals to and from said remote station. Said central station being arranged to transmit at least one unique binary coded reset signal to said remote stations followed by an uninterrupted string of signal bits designating one binary value. Each of said remote stations after detecting said unique reset signal examines the received bit stream for N consecutive one valued binary bits and begins transmitting data which includes a leading bit of said other binary value. One station only will receive a said one valued bit following receipt of said N bits and will continue transmitting. The remaining stations will receive a said other valued bit and will terminate transmission. Any station receiving N+1 consecutive bits of said one binary value will await receipt of another reset signal before attempting to transmit another data message.

DESCRIPTION OF THE PREFERRED EMBODIMENT

Figure 1:
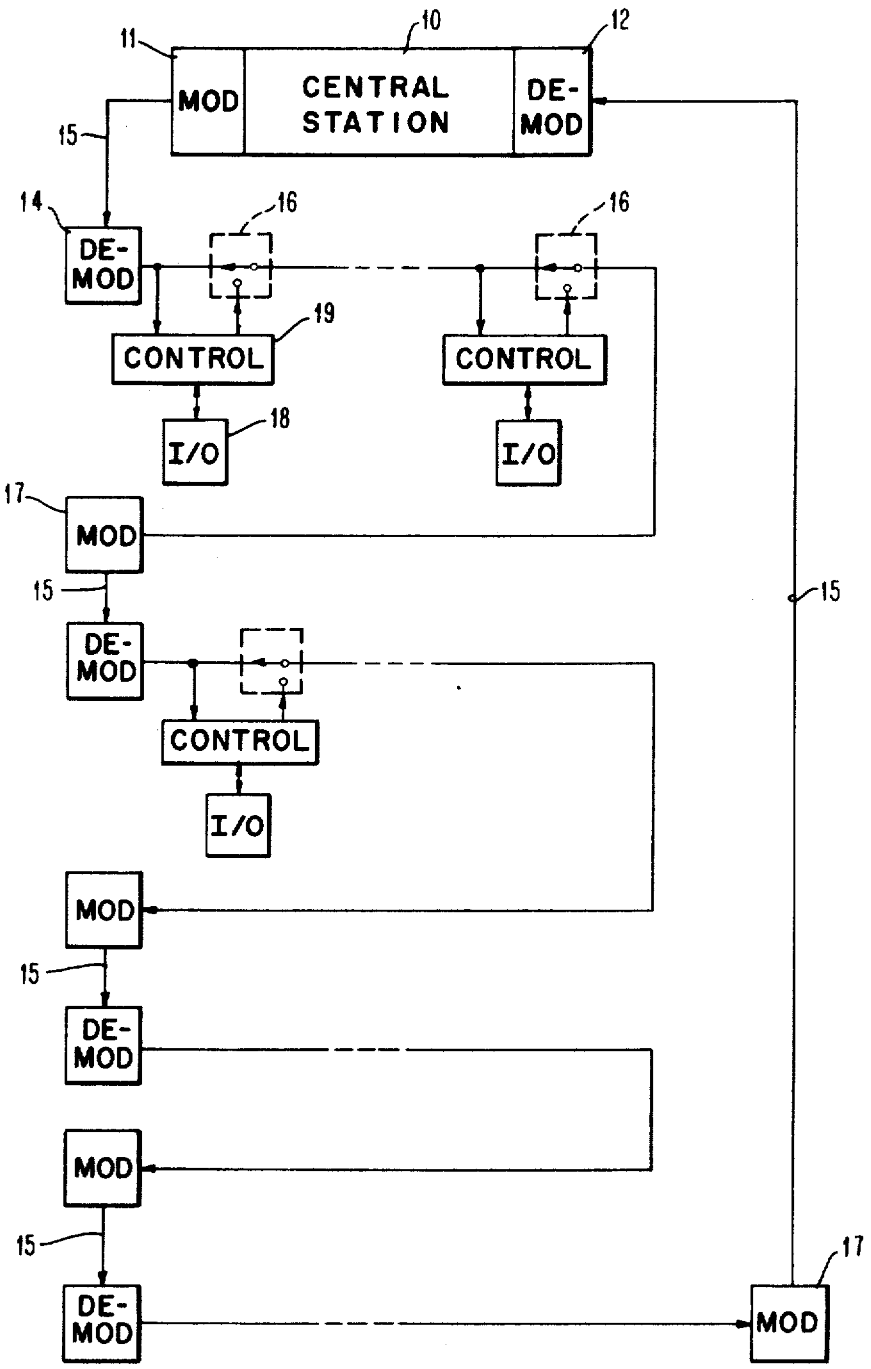
FIG. 1 is a block diagram of a communications system constructed according to the invention.

The overall system configuration is illustrated in FIG. 1 and includes a central station 10 which is provided with a modulator 11 for transmitting binary coded electric signals onto the loop and a demodulator 12 for receiving signals from the loop. A first cluster of terminals is serviced by a remote demodulator 14 connected to modulator 11 by a two-wire transmission line 15. The characteristics of line 15 determine the maximum bit rate at which the network can operate.

The demodulated signal passes through a switch 16 associated with each terminal. When the switch 16 occupies the position illustrated, a modulator 17 following the last switch 16 associated with the last terminal of the cluster prepares the signal on the line for transmission to the next cluster. The remaining clusters are similar and differ only in the number of terminals which are connected. Modulator 17 of the last cluster is connected to demodulator 12 of the central station by a two-wire transmission line 15 as previously described.

All of the signal transmission lines are two-wire and no additional control conductors are required.

Each remote input station in the cluster includes an input/output device 18 connected to the line and switch 16 by a control circuit 19. When an input/output terminal 18 is receiving data from the central station 10, switch 16 may be in the position illustrated or in the alternate position depending upon the mode of operation chosen. This will become apparent later as the description continues. When the input/output terminal 18 is transmitting data to the central station 10, switch 16 must be in the alternate position from that illustrated. Thus, data is entered onto the line from the input/output terminal 18 via the control circuit 19 through the switch 16 onto the line and is eventually received at the demodulator 12.

Data transmission on the loop may be from the central station 10 to any of the I/O units 18 on the loop or from any of the I/O units 18 on the loop back to the central station 10. When the central station 10 is transmitting data to one of the I/O units 18, it selects a unique address for the particular I/O unit 18 which is to receive the data. The message for the I/O unit 18 is preceded by this unique address. Each of the control units associated with I/O units 18 monitor the data on the line and when they decode a unique address, they accept the following data. At least periodically, the input/output units 18 on the loop will be provided an opportunity for transmitting messages back to the central station 10. In order to accomplish this, the central station 10 will transmit a unique coded character called a "reset code" to all of the control units 19 associated with the input/output devices 18 on the loop. The reset character will enable the control units to seize the communication loop under conditions which will be described below. After the unique reset code or character has been transmitted, the central station 10 will transmit an uninterupted string of one bits. The one bits were selected since they are the marking frequency of a conventional modulator which would be used for the modulator 11. The zero bit indication could have been chosen without a material modification of the system which will be described below.

Figure 2:
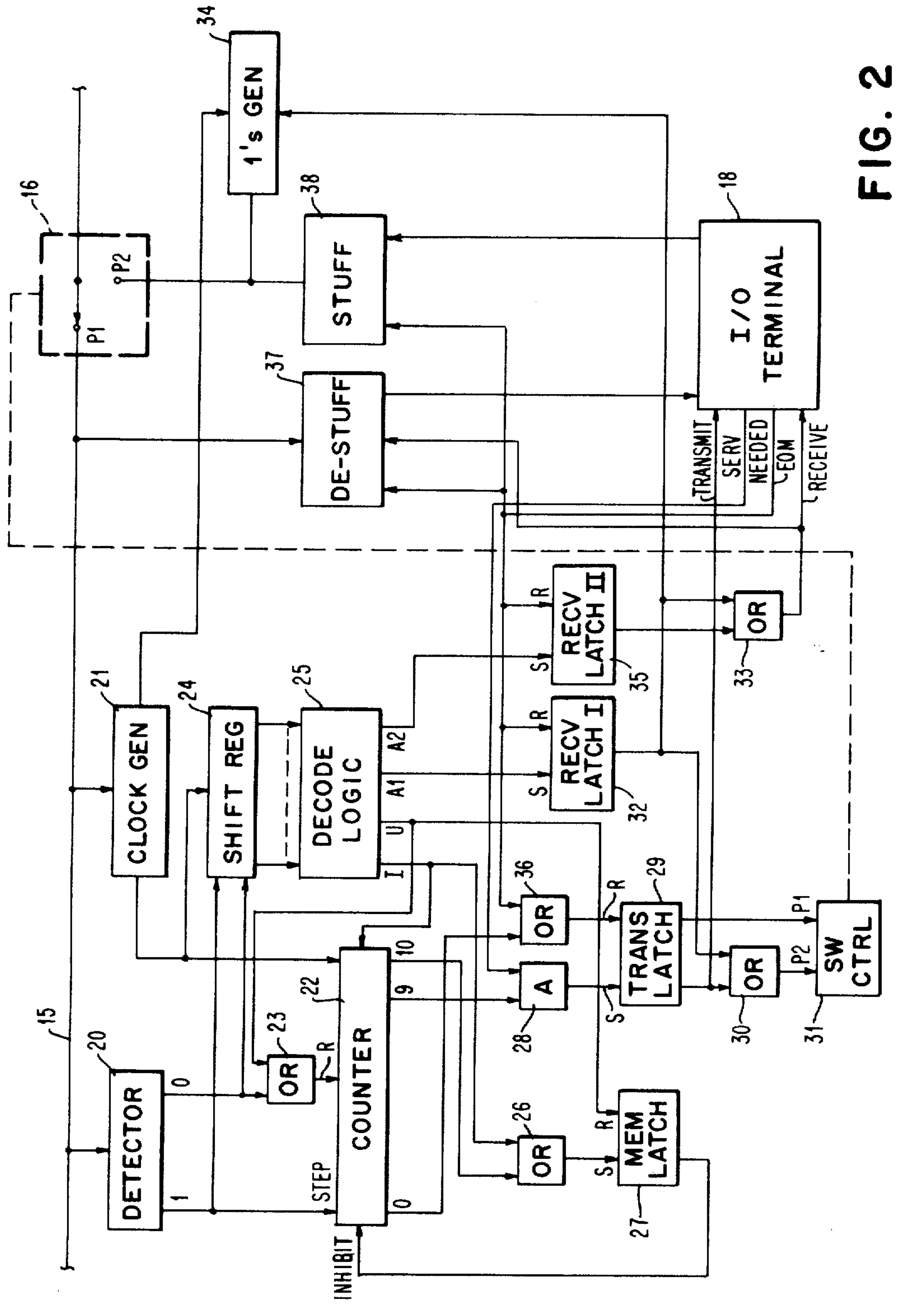
FIG. 2 is a detailed block diagram of a single remote station illustrated in FIG. 1.

In FIG. 2, devices previously described such as switch 16 and input/output device 18 bear the same reference numerals used in the description of FIG. 1. The control unit 19 includes a detector 20 which is connected to the two-wire transmission line 15. Detector 20 provides a first output indicating the presence of a signal defining a one bit in the binary notation and a second output indicating a zero bit in the binary notation. The form which detector 20 may take will, of course, depend on which signalling system is selected from amongst those available in the prior art. A clock signal generator 21 is also connected to the transmission lines 15 and generates clocking pulses which occur during each bit time. The one output from detector 20 is connected to the step input of a binary counter 22. Counter 22 is also connected to the output from clock generator 21 which causes the counter to increment at the clock time from clock generator 21 if the detector 20 output is one. Thus, as successive ones are transmitted on the line 15, the counter 22 will increment with each one bit received. The zero output from detector 20 is connected via an OR circuit 23 to the reset input of counter 22 and resets counter 22 to zero or some other predetermined value each time a zero bit occurs during a clock pulse output from clock generator 21. With the arrangement described, counter 22 will count successive one bits on the transmission line and will reset to zero upon the receipt of an intervening zero. Thus, it will count up to a maximum value of ten at which time the counter will be locked via a signal generated by circuits to be described later. The generated signal is applied to an inhibit input for the counter 22. The inhibit input prevents further stepping of the counter when it is activated.

The one and zero outputs of detector 20 and the output of clock generator 21 are also applied to a shift register 24 which receives the bits in serial fashion on the line 15 and shifts these into register 24. When the register is full, the most recent bit is entered into the first position in the shift register and the oldest bit in the register is dropped. Thus, register 24 contains a history of the bit patterns on the line 15. A decode logic circuit 25 is connected to the shift register 24 and examines the prior history on the line for decoding certain control characters. Four control characters are indicated in the drawing. The first is an interrupt character (I) which is utilized for terminating transmission at the terminal or preventing transmission in the future. The second character is a reset or unlocked character (U) and is applied via OR gate 23 to the reset input of counter 22 and causes the counter 22 to reset under conditions which will be described later. Two address characters (A1) and (A2) may be decoded. The first address character A1 is unique to the input/output terminal 18 and will not be decoded by any other control circuit 19. The second address decoded A2 may be unique to groups of input/output terminals; thus, permitting broadcast capability to several terminals for a given message on the line 15. Additional unique addresses may be provided which enlarge or detract from the group selected; thus, a third address may be provided which would be recognized by all control units associated with all of the input/output terminals 18 to provide a network broadcast capability. Decode logic circuit 25 may consist of nothing more than a plurality of AND gates which are connected selectively to the outputs from shift register 24 and, when the output assumes a certain configuration, provide an output on the lines as indicated and described above.

The inhibit signal previously described is generated when the counter 22 reaches a count of 10. The 10 count output from counter 22 is connected via an OR citcuit 26 to the set input of a memory latch 27. Thus, when the memory latch 27 is set, it provides an output which is applied to the inhibit input of counter 22 preventing the counter from responding to further resets or step signals. The reset input of memory latch 27 is connected to the unlock or reset output (U) from decode logic circuit 25. Thus, under control of the central station, the memory latch 27 may be reset taking the inhibit off of counter 22 and the same output which resets the memory latch 27 will via OR gate 23 cause counter 22 to reset to the zero position. Once this is accomplished, the counter will respond to the step inputs and reset inputs provided via detector 20 as previously described. The inhibit output of decode logic circuit 25 is applied to counter 22 and causes the counter to be set at the value of 10. At the same time, it is applied via OR circuit 26 to the set input of memory latch 27 causing the latch to be set and the counter inhibited from further changes.

Each of the I/O terminals 18 must provide two signals for the control circuit 19. These are service needed and end of message. Thus, if an input/output terminal 18 has data to send to the central station, it will provide a signal on the service-needed line which indicates that at the appropriate time, the control circuit should seize the line if it is available. The end of message signal on the EOM line is provided to inform the control circuit 19 that the terminal has completed a data transmission. This line will be activated in both the receive and transmit modes of the terminal. That is, when the terminal is receiving data, the central station will append to the data an end of message signal which the terminal will decode and transmit to the control circuit. Thus, the control circuits may take any steps necessary to reset and recognize a condition. The service-needed line from the input/output terminal 18 is connected to one input of an AND circuit 28. The other input of AND circuit 28 is connected to the nine output stage of counter 22. Thus, if service-needed is active and counter 22 reaches a count of nine, AND gate 28 develops an output which will set a transmit latch 29. When latch 29 is set, it provides an output on a line labeled "transmit" to the input/output terminal 18 which will enable the terminal to start transmission any time the line is active. The output of the transmit line from transmit latch 29 is applied via an OR circuit to one input of a switch control circuit 31 which causes switch 16 to switch to position P2. The transmit latch 29 provides another output P1 connected to switch control circuit 31 which causes switch 16 to connect point P1 to the output side of the loop.

When decode logic circuit 25 decodes address A1, this causes a receive latch 32 to be set. The output of receive latch 32 is connected to another input of OR circuit 30 and exercises the same control over switch 16 as the output of transmit latch 29. In addition, the output of receive latch 32 is also connected via an OR circuit 33 to a receive control line to input/output terminal 18. The signal on this input line prepares the input/output terminal 18 to receive data from the line. In addition, the output of latch 32 is also connected to a ones bit generator 34 which assumes the function of the central station by supplying one bits to the lines for downstream terminals. With this arrangement, full duplex operation of the loop is possible. Thus, a message may be sent to a terminal upstream of a known transmitting terminal and the recipient terminal takes over the function of the central station of supplying the one bits to the line while the central station is transmitting data to the receiving terminal upstream of a then transmitting terminal. If full duplex operation is neither necessary or desired, the circuits for generating the one bits may be eliminated and in addition switch 16 must be left in position P1. Where this is done, full duplex operation is not possible under all conditions.

When address A2 is decoded by logic circuit 25, the output A2 supplied by decode logic circuits 25 is applied to the set input of a receive latch 35. The output of receive latch 35 is only applied to OR circuit 33. Full duplex operation is not possible with group addressing since the first terminal on the line would interrupt the message if the connections illustrated with the output of receive latch 32 were utilized. Thus, during group addressing or broadcast mode, a receive operation at the terminals is the only communications which may be carried out on a transmission network.

The end of message signal, EOM, from the input/output terminal 18 is applied to the reset inputs of latches 35, 32 and 29. It is applied to the reset input of latch 29 via an OR circuit 36. Latch 29 will also be reset at zero count of counter 22. This is accomplished by connecting the output from the zero count via OR circuit 36 to the reset input of transmit latch 29. Thus, transmit latch 29 will be reset either at the end of transmission or at any time the count reverts to zero.

Data from line 15 is passed through a destuffing circuit 37 before being applied to the input/output terminal 18. Likewise, data originating at the input/output terminal 18 is passed through a stuffing circuit 38 before being applied via contact P2 and switch 16 to the line 15. Both the destuffing and stuffing circuits 37 and 38, respectively are reset at the end of message signal EOM from the input/output terminal 18. The destuffing and stuffing circuits 37 and 38 are necessary to prevent strings of one bits from occurring which would equal nine. Thus, if two adjacent characters between them had nine consecutive bits, these would activate circuits on the line as will be described later. In order to avoid this, a count of the consecutive one bits is maintained in the circuits 37 and 38. In destuffing circuit 37 whenever the count of eight is reached, the next bit is automatically removed. In stuffing circuit 38, a count of the number of one bits on the line from I/O terminal 18 is maintained and as soon as eight one bits are detected, a zero is forced onto the line. The construction and operation of destuffing circuit 37 and stuffing circuit 38 will be described later in connection with the description of FIGS. 3 and 4.

It will be assumed in the following description of the operation of the circuits illustrated in FIG. 2 that counter 22 is inhibited at the count of 10 and that the central station wishes to permit transmission of data from the terminals on the loop to the central station. In order to do this, it would issue the unique reset signal as soon as this signal is received in the shift register 24 via detector 20. It is decoded in logic circuit 25 and an output provided on the reset or unlock conductor (U). The output on the unlock conductor resets the memory latch 27 and counter 22. At this point, the counter will respond to the outputs from detector 20. Following transmission of the unique reset character, the central station 10 begins transmitting an uninterrupted string of one bits. Detector 20 detects the one bits. These are applied to the step input of counter 22. Counter 22 will progress to a count of nine. At the count of nine, the output from counter 22 is applied via AND circuit 28 to the set input of the transmit latch 29. The output of the transmit latch 29 at this time is applied via OR circuit 30 to switch control circuit 31 which causes switch 16 to be switched to position P2. At the same time, a transmit signal is supplied to the input/output terminal 18. At this time, input/output terminal 18 commences transmitting and has as its first transmitted bit a zero. If no upstream terminal has commenced transmitting, the tenth bit received will be a one and transmit latch 29 will remain set until the input/output terminal 18 provides an end of message signal EOM. At the count of ten, the ten output from counter 22 is applied via OR circuit 26 to the set input of memory latch 27, the output of which inhibits counter 22 from further counting. Thus, after the terminal 18 has transmitted its entire message, the control circuits 19 will not attempt to acquire the line again. When transmission has been completed, input/output terminal 18 will emit an EOM signal on the EOM line which will cause transmit latch 29 to reset. This will cause switch control circuit 31 to restore switch 16 to the P1 position and terminate transmission turning control back to the central station.

If an upstream terminal had commenced transmitting at attaining a count of nine, the first bit it transmitted would have been a zero. This bit would have been detected in detector 20 which would have caused counter 22 to go from a count of nine to a count of zero. At the count of zero, the transmission latch 29 would have been reset by the zero output from counter 22 via OR circuit 36. This would have caused the transmit signal to terminate and the input/output terminal 18 would have stopped transmission after one bit and would again wait for another signal. As soon as transmit latch 29 is reset, switch control circuit 31 would have caused switch 16 to assume the P1 position; thus, permitting the message from the upstream terminal to continue down the transmission line. In effect, the zero from the upstream terminal would not have been passed via switch 16; however, the zero from input/output terminal 18 would have been substituted for the zero transmitted by the upstream terminal and the message from the upstream terminal would eventually reach the central station 10 in unaltered form.

When an input operation at terminal 18 is desired, the central station 10 causes the address for that station, A1, to be transmitted on line 15. This address is received in shift register 24 and decoded by decode logic circuit 25. When the address A1 is decoded, receive latch 31 is set. This latch causes switch control circuit 31 to move switch 16 to position P2 and at the same time, the output of latch 32 causes the ones generator 34 to commence generating ones. These ones are supplied via switch 16 to all downstream terminals which may be operating in the transmit mode as previously described. The output of latch 32 is also supplied via OR circuit 33 to the input/output terminal 18 and causes the input/output terminal 18 to receive the data arriving to the input of the terminal via the destuffing circuit 37. When the end of message is received by the input/output terminal 18, it provides an end of message signal EOM which is used to reset latch 32 causing switch 16 via switch control circuit 31 to assume position P1 and terminating the generation of the ones from generator 34. If the address A2 had been decoded, that is, a group addressing type message in which the same message is transmitted to a number of terminals which will respond to the A2 address, receive latch 35 would have been reset. In this type of operation, the ones generator 34 is not activated and switch 16 remains in the P1 position. The message is received via the destuffing circuit 37 and transmitted through switch 16 to subsequent downstream terminals. Again, upon the receipt of the end of message, the EOM signal is generated which causes receive latch 35 to reset and input/output terminal 18 stops receiving data via destuffing circuit 37. In all of the above situations, the destuffing and stuffing circuits 37 and 38, respectively are reset with the EOM signal from the input/output terminal 18.

Figure 3:
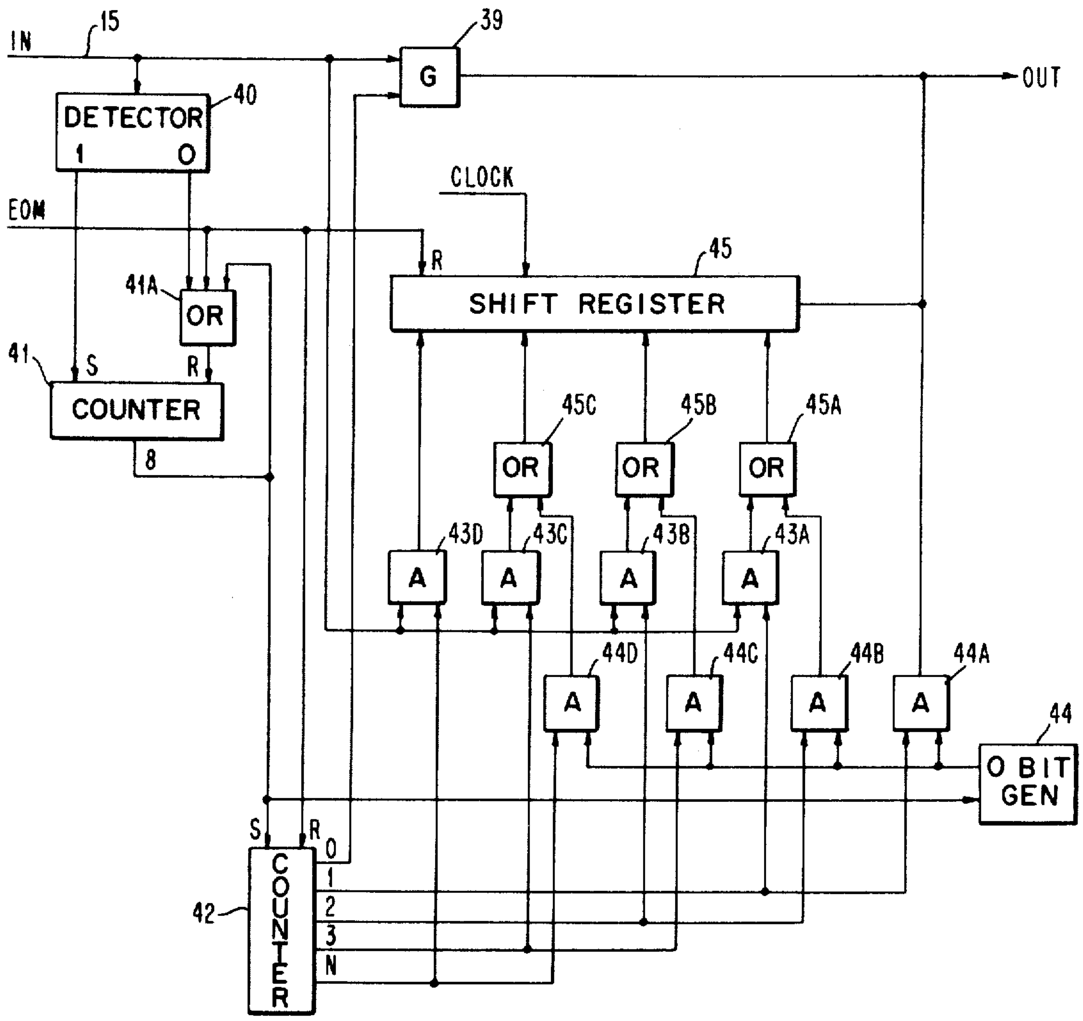
FIG. 3 is a block diagram of the bit stuffing circuit illustrated in block form in FIG. 2.

The bit stuffing circuit 38 illustrated in FIG. 3 is designed primarily to insert a bit in a stream of bits at any time eight consecutive one bits are detected. The signal from the terminal 18 is applied to a detector 40 which is identical to the detector 20 described in FIG. 2 and provides one and zero outputs. The one output is applied to the set input of a counter 41 and the zero output to the reset input of counter 41 via an OR gate 41A. The signal on the line from terminal 18 is also applied to gate 39 which normally connects the input signal to the output which is connected to contact P2 of switch 16. Each time counter 41 reaches a count of eight it increments a second counter 42 which steps upon the first count of eight from a zero state to state one. When counter 42 is in any state except zero, gate 39 opens and the data path from the input to the output is interrupted. The data from the terminal 18 is connected to a plurality of AND gates 43A, 43B, 43C and 43D. Gates 43A – 43D are connected to the outputs 1 – N, respectively from counter 42. The output of gate 43D is connected to a shift register 45 and the outputs of gates 43A – 43C are connected via OR gates 45A – 45C, respectively, to shift register 45 and thus introduce one bit of delay each time counter 41 reaches a count of eight. The eighth output from counter 41 is applied to a zero bit generator 44 which has its output connected to a plurality of AND gates 44A – 44D. These gates are under control of the outputs 1 – N, respectively from counter 42. The output of gate 44A is connected directly to output shift register 45 while the outputs of gates 44B – 44D are connected via OR gates 45A – 45C, respectively to the shift register 45. With this arrangement, a zero bit is inserted in the bit stream between an eighth consecutive one bit and the following ninth bit. The shift register 45 provides the required delay to accommodate the added bits. The end message signal EOM from the terminal is applied to the reset inputs of counter 41, counter 42 and shift register 45 and restores the circuit to a starting state when receipt of a message has been completed.

Figure 4:
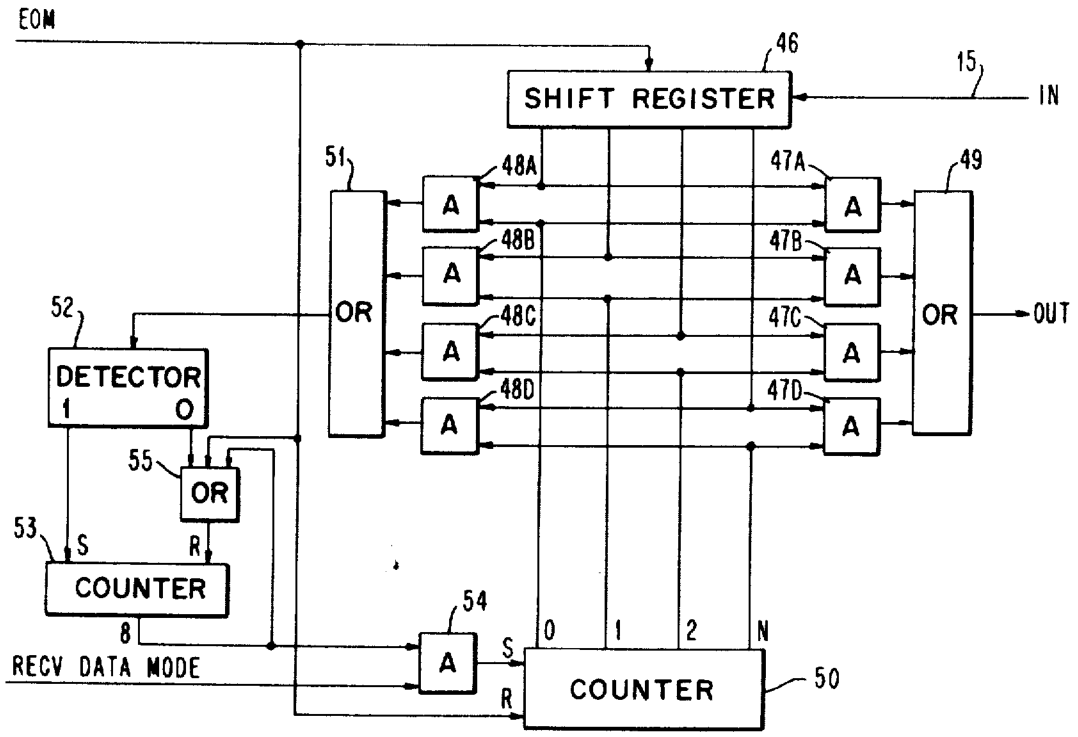
FIG. 4 is a block diagram of the bit destuffing circuit illustrated in block form in FIG. 2.

The bit destuffer illustrated in FIG. 4 examines the bit stream and when it detects eight consecutive one bits, it removes the next following bit. In order to accomplish this, the data stream from the transmission line 15 is shifted into a shift register 46. Each of the positions in the shift register is connected to a pair of AND gates 47A – 47D and 48A – 48D. Gates 47A – 47D are connected to an OR circuit 49 which provides the usable output. The other inputs of AND gates 47A – 47D are connected to the outputs 0, 1, 2 – N of a counter 50. The outputs of gates 48A – 48D are connected to an OR circuit 51 which is connected to a detector circuit 52 similar to the detector circuit 20 illustrated in FIG. 2. The outputs 0, 1, 2 – N of counter 50 are connected to gates 48A – 48D in the same fashion as 47A – 47D. At reset which occurs following an EOM, counter 50 resides at a count of zero. Thus at the beginning of the reception of any message, only gates 48A and 47A are enabled and data received into shift register 46 shifts from the first to the last stage where it is made available via gates 47A and 48A and OR gates 49 and 51. The one output from detector 52 is applied to another counter 53 which increments each time a one is supplied from detector 52. When counter 53 reaches a count of eight, a signal is applied to an AND circuit 54, the output of which is connected to an input of counter 50 and causes counter 50 to increment. When counter 50 increments from zero to one, a bit in the shift register 46 is dropped by connecting the OR circuit to the next position in the shift register via gates 48B and 47B. This causes the ninth bit in the bit stream to be dropped upon the detection of eight consecutive one bits. Counter 53 is reset each time a zero is detected. Thus, only consecutive one bits are registered in counter 53. This is accomplished by connecting the zero output from detector 52 through an OR circuit 55 to the reset input of counter 53. Counter 53 is also reset each time a count of eight is achieved by connecting the eight output from the counter back through OR circuit 55 to the reset input of the counter. In addition, counter 53 is reset when the EOM is issued by the receiving terminal to prepare the counter for s subsequent data entry.

Figure 5:
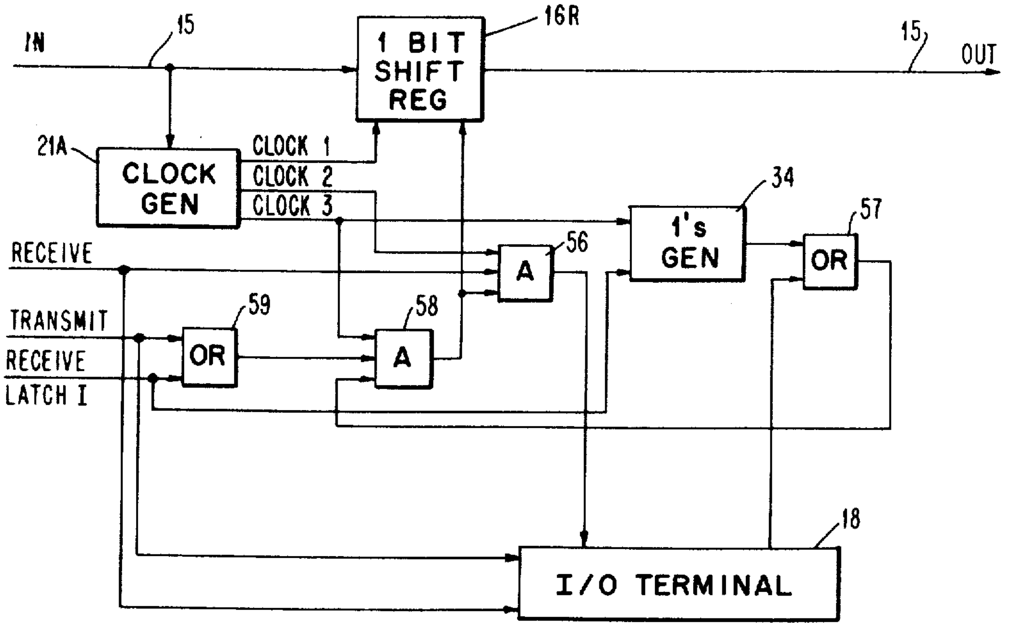
FIG. 5 is a block diagram of a modification of the remote station illustrated in FIG. 2.

FIG. 5 illustrates a modification of the control circuits illustrated in FIG. 2 in which a one-bit shift register 16R is substituted for the switch 16 illustrated in FIG. 2. In this embodiment, a clock generator 21A provides three clock phases at a minimum during each bit period. During the first clock phase, the data on the transmission line is shifted into the register 16R and the data residing in the register is shifted out onto the line. During the second clock phase, the data in the register which has been shifted in during the first clock phase is sampled for reading purposes and during the third clock phase, new data, if required, is substituted for the data residing in the register.

FIG. 5 illustrates the modifications necessary to the control unit illustrated in FIG. 2 for substituting a one-bit shift register 16R for the switch interface illustrated in FIG. 2. A clock generating circuit 21A connected to the transmission line 15 samples the data on the line and generates at least three clock phases during each bit period. The first clock phase is connected to the shift register 16R and causes data in the shift register to be shifted out and new data on the input line 15 to be shifted in, in place thereof. The second clock phase is used for reading and sampling the data in the shift register where this function is required and the third clock phase is used for inserting data in the shift register when this function is required. The data in the shift register is applied to an AND circuit 56 during clock phase two and the receive mode is gated to the input/output terminal 18. The receive mode signal is provided by the output of OR circuit 33 illustrated in FIG. 2. Data from the input/output terminal 18 is applied via an OR circuit 57 to an AND gate 58. The output of AND gate 58 is connected to the shift register 16R. AND gate 58 is enabled during clock period three and via an OR circuit 59 during either transmit times or under control of receive latch 32. The output of ones generator 34 is applied through OR circuit 57 and AND gate 58 to the shift register 16R when receive latch 32 is active, thus supplying the stream of uninterrupted ones which normally are supplied by the central station for maintaining operation of the inputting of data to the central station while the central station is transmitting data to terminal 18. This function is identical to the same function previously described. Of course, the ones are inserted into the shift register during the third phase of clock generator 21A in order to preserve the incoming data which is read into the terminal during the second phase of clock generator 21A. Here again, if full duplex operation is not required, or desired, ones generator 34 and the gating described for inserting the ones into the shift register 16R may be eliminated. Since in this version, switch 16 has been replaced by the shift register 16R, the switch control circuit 31 and the OR circuit illustrated in FIG. 2 may be eliminated entirely.

While the invention has been particularly shown and described with reference to preferred embodiments thereof, it will be understood by those skilled in the art that various changes in form and details may be made therein without departing from the spirit and scope of the invention.

What is claimed is:

1. A method of operating a serial loop binary coded data communications system having a central station and a plurality of remote stations connected in a serial loop comprising the steps of:

at said central station transmitting a first unique coded signal to said remote stations which enables the subsequent transmission of data from each of the remote stations; and thereafter transmitting an uninterrupted string of signal bits designating one binary value;

at said remote stations receiving the signal bits on the loop and examining said bits to detect the said first unique code signal enabling the subsequent transmission of data;

following receipt of said unique coded signal initiating transmission following receipt of N contiguous one binary valued bits, said transmission having at least its first bit of said other binary value;

completing transmission of the message only if the bit received at the remote station following receipt of said N contiguous bits is of said one binary value; and awaiting receipt of another first unique coded signal following receipt of N+1 consecutive one binary valued bits before attempting to transmit another message.

2. The method set forth in claim 1 in which at each of said remote stations a count is maintained of the receipt of said one valued bits and reset upon the receipt of a said other value bit provided the count has not reached N+1.

3. A data transmission system comprising:

a central station;

a plurality of remote stations each including a data source;

means for interconnecting said central station and said remote station in a serial loop;

said central station including means for generating and transmitting to said remote stations a first unique coded control signal which authorizes transmission of data from said remote stations, and means for generating and transmitting to said remote stations an uninterrupted series of uniform signal bits of one of at least two possible states immediately following the transmission of said first unique coded control signal;

said remote stations each including, means for receiving and inserting data from the said loop, means for examining the data on the loop for detecting the presence of said first unique control signal, means operative following receipt of said first unique control signal for detecting the presence of N consecutive uniform signal bits of said one state, means for initiating the transmission of data from said data source if said data source has data to transmit, following detection of N consecutive signal bits of said one state, said data including a leading bit differing in state from said bits of said one state, and means responsive to the receipt of N+1 consecutive signal bits of said one state for permitting completion of data transmission and for inhibiting the start of transmission of another message until a subsequent first unique control signal is received.

4. A data transmission system as set forth in claim 3 in which the means at the remote stations for detecting N consecutive uniform signal bits of said one designation includes a counter means which increments each time a bit of said one designation is received and resets to a predetermined state when a bit other than said one designation is received provided N+1 bits of said one designation have not been received.

5. A data transmission system as set forth in claim 4 in which the means for receiving and inserting data from the loop includes a two-position switch arranged to provide an uninterrupted flow of data on the loop in one position and in its alternate position to interrupt the loop and permit the introduction of data originating at the data source on the loop.

6. A data transmission system as set forth in claim 4 in which the means for receiving and inserting data from the loop includes a shift register having at least one bit of storage arranged in the loop and switching means for selectively gating data bits out of and into the shift register.

* * * * *